Nov. 21, 1961 A. F. OTTINGER 3,009,627
BAGS
Filed March 13, 1958

August F. Ottinger,
Inventor.
Koenig and Pope,
Attorneys.

United States Patent Office 3,009,627
Patented Nov. 21, 1961

3,009,627
BAGS
August F. Ottinger, St. Louis, Mo., assignor to Bemis Bros. Bag Company, St. Louis, Mo., a corporation of Missouri
Filed Mar. 13, 1958, Ser. No. 721,250
6 Claims. (Cl. 229—62)

This invention relates to bags, and more particularly to bags made of heat-sealable plastic such as polyethylene.

Bags made of heat-sealable plastic such as polyethylene are particularly useful for the packaging of various materials where it is desirable that contamination of the material in the bag be avoided. For example, there are various chemical products and food products which, if packed in a bag made of kraft paper, for example, may be contaminated by paper particles rubbed from the paper of the bag. The use of a polyethylene bag avoids such contamination, but presents a problem in regard to the filling and sealing of the bag, and particularly so in the case of filling with a dusty material, since dust on polyethylene interferes with the heat-sealing thereof. Among the several objects of this invention may be noted the provision of a bag made of heat-sealable plastic, such as polyethylene, and particularly a bag which as supplied is initially completely sealed to insure against contamination from the outside, the bag being adapted to be filled through an opening made in the bag and subsequently heat-sealed to close the filling opening, and the construction of the bag being such that a strong seal is provided, even though conditions may be such that dust accumulates on the bag. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a perspective of plastic bag to be filled and closed in accordance with this invention;

Corresponding reference characters indicate corresponding parts throughout the several views of the drawings.

Figure 1:
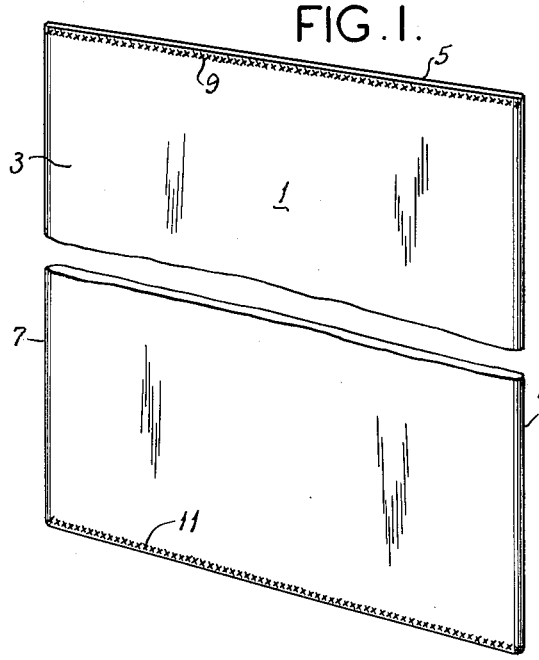

Referring to the drawings, FIG. 1 illustrates a bag 1 which as shown consists of a flat seamless tube of heat-sealable plastic such as polyethylene. The front and back walls of the bag are designated 3 and 5, respectively. The side edges of the bag, which are constituted by folds of the plastic, are designated 7. The ends of the tube are initially closed by transverse heat seals 9 and 11 at top and bottom securing together the front and back walls entirely across the width of the tube. It will be understood that the bag may consist of a longitudinally seamed tube instead of a seamless tube.

Figure 2:
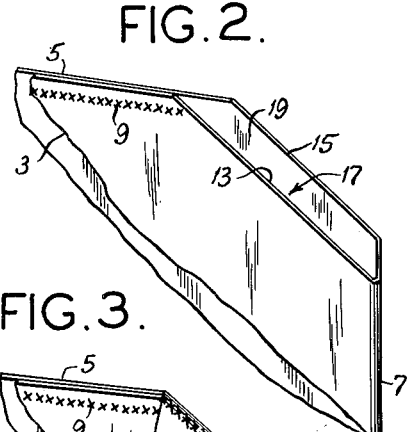
FIG. 2 is a view of the upper right corner of the bag prepared in accordance with this invention for filling.

In accordance with this invention as illustrated in FIG. 2, one wall of the bag tube, the front wall 3 as shown, has a triangular portion thereof at the upper right corner cut off on an oblique line 13, and the other wall, the back wall 5, has a smaller triangular portion thereof at the upper right corner cut off on an oblique line 15 generally parallel to and spaced outward from the line 13. The result of this is that a filling opening 17 is provided at the upper right corner of the bag together with a flap portion 19 of the back wall 5 which extends beyond the oblique line or edge portion 13.

Figure 3:
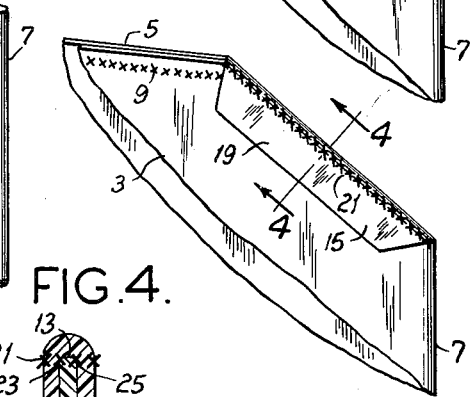
FIG. 3 is a view corresponding to FIG. 2 showing the bag closed after filling.
Figure 4:
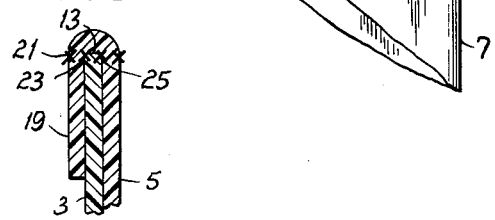
FIG. 4 is an enlarged cross section taken on line 4—4 of FIG. 3.

The bag may then be filled, as for example, by inserting a filling spout into the bag through the filling opening at 17 and delivering the material to be packed in the bag through the spout. When the bag has been filled, the spout is withdrawn. Any dust which may have accumulated on the surface of flap portion 19 which faces in the direction toward the front wall 3 and which may have accumulated on the outside of the front wall 3 adjacent the oblique edge portion 13 may be readily and quickly wiped off. Then, the flap portion 19 is folded over on oblique edge portion 13 as illustrated in FIGS. 3 and 4 to overlie the front wall 3, and heat-sealing means is applied to the folded-over flap portion 19 and the back wall 5 of the bag to heat-seal the flap portion 19 throughout the length of the opening 17 to the front wall 3 and concomitantly to heat-seal the front and back walls 3 and 5 together along a line 21 extending lengthwise of the flap immediately adjacent the edge portion 13. This heat-sealing along line 21 includes heat-sealing at 23 of the flap to the front wall and heat-sealing at 25 of the front wall to the back wall. With line 21 located immediately adjacent the edge portion 13, the opening 17 is completely sealed. While dust between the front and back walls may interfere with a strong heat seal at 25, the seal at 23 will be a strong heat seal. Moreover, it will be capable of strongly resisting breaking open of the flap portion 19 because its position is such that the major stress to which it is subjected is stress in shear, rather than the peeling-apart type of stress to which the seal at 23 is subjected.

Figure 5:
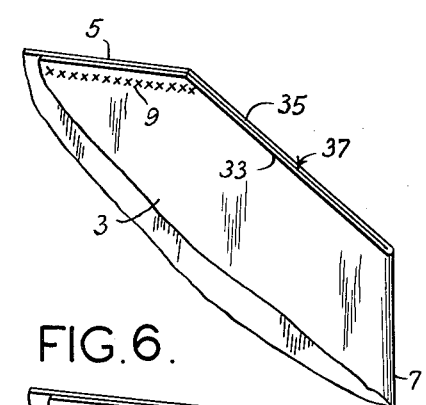
FIGS. 5–7 are views corresponding to FIGS. 2–4 showing a modification.
Figure 6:
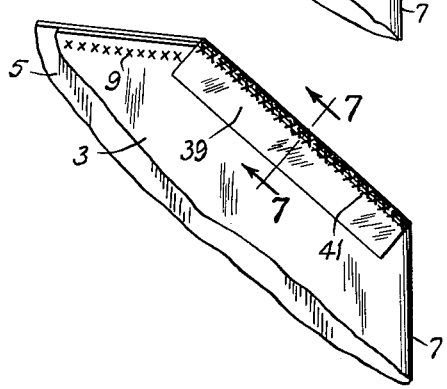
Figure 7:
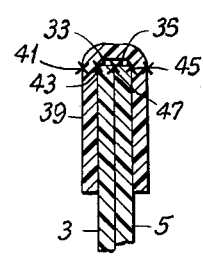

FIGS. 5–7 illustrate a modification of the above in which the bag 1, instead of being cut off as shown in FIG. 2, has a generally triangular portion cut off at the upper right corner on an oblique line whereby the front and back walls 3 and 5 have registering oblique edge portions 33 and 35 defining a filling opening 37 at this corner. After the bag has been filled through this opening, the outside surfaces of the front and back walls adjacent the edge portions 33 and 35 are wiped clean. Then a piece of heat-sealable plastic 39 is folded over edge portions 33 and 35 to cover the filling opening and to overlie the front and back walls on the outside thereof, and this piece or flap 39 is heat-sealed throughout the length of the opening to the walls along a line 41 immediately adjacent edge portions 33 and 35 with concomitant heat-sealing of the walls together along this line. The heat-sealing of the flap 39 to the front and back walls 3 and 5 is indicated at 43 and 45 in FIG. 7, and the heat-sealing together of the walls is indicated at 47. While the seal at 47 may not be a strong seal if dust is present, the seals at 43 and 45 will be strong seals resisting breaking away of the flap 39.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A filled bag comprising a tube of heat-sealable plastic having transverse heat seals closing both its ends, said bag having an oblique edge portion at one corner thereof defining an opening at said corner, and a flap of heat-sealable plastic folded around over said edge portion and heat-sealed to the bag along a line immediately adjacent said edge portion completely to seal said opening.

2. A filled bag as set forth in claim 1 wherein said flap is an integral portion of one wall of the bag.

3. A filled bag as set forth in claim 1 wherein said flap is a piece of heat-sealable plastic heat-sealed to the bag.

4. A filled bag comprising a tube of heat-sealable plastic having transverse heat seals closing both its ends, at least one wall of the bag at one corner thereof having an oblique edge portion defining an opening at said corner and a flap portion of the other wall extending beyond said edge portion, said flap portion being folded around over said edge portion to overlie said one wall and heat-sealed thereto along a line immediately adjacent said edge portion, said bag walls being heat-sealed together along said line, thereby completely to seal said opening.

5. A filled bag comprising a tube of heat-sealable plastic having transverse heat seals closing both its ends, one wall of the bag at one corner thereof having a first oblique edge portion and the other wall of the bag at said corner having a second oblique edge portion spaced outward from said first oblique edge portion defining an opening at said corner and a flap portion of said other wall extending beyond said first oblique edge portion, said flap portion being folded around over said first oblique edge portion to overlie said one wall and heat-sealed thereto along a line immediately adjacent said first oblique edge portion, said bag walls being heat-sealed together along said line, thereby completely to seal said opening.

6. A filled bag comprising a tube of heat-sealable plastic having transverse heat seals closing both its ends, the walls of the bag at one corner thereof having oblique edge portions defining an opening at said corner, and a piece of heat-sealable plastic folded around said edge portions covering the opening and overlying the bag walls on the outside thereof and heat-sealed to said walls along a line immediately adjacent said edge portions, said bag walls being heat-sealed together along said line, thereby completely to seal said opening.

References Cited in the file of this patent

UNITED STATES PATENTS

| | | |
|---|---|---|
| 2,257,823 | Stokes | Oct. 7, 1941 |
| 2,292,295 | Royal | Aug. 4, 1942 |
| 2,298,421 | Salfisberg | Oct. 13, 1942 |
| 2,443,584 | Shumann | Apr. 13, 1948 |
| 2,584,632 | Southwick | Feb. 5, 1952 |
| 2,620,944 | Stahl | Dec. 9, 1952 |
| 2,643,049 | Bartelt | June 23, 1953 |
| 2,705,103 | Carlile | Mar. 29, 1955 |
| 2,899,347 | Kindseth | Aug. 11, 1959 |